United States Patent [19]

Shulof et al.

[11] Patent Number: 4,714,202
[45] Date of Patent: Dec. 22, 1987

[54] PULVERIZED SOLID CONTROL SYSTEM

[75] Inventors: George F. Shulof, Bloomfield; Michael J. DiMonte, South Windsor, both of Conn.

[73] Assignee: Combustion Engineering, Inc., Windsor, Conn.

[21] Appl. No.: 828,490

[22] Filed: Feb. 12, 1986

[51] Int. Cl.⁴ ............................................. B02C 25/00
[52] U.S. Cl. ........................................ 241/30; 241/33; 241/301
[58] Field of Search ..................... 241/30, 33, 34, 35, 241/36, 37, 301; 200/1 R

[56] References Cited

U.S. PATENT DOCUMENTS

4,225,091 9/1980 Steler .............................. 241/34 X

Primary Examiner—Timothy V. Eley
Attorney, Agent, or Firm—Arthur E. Fournier, Jr.

[57] ABSTRACT

A control system (40) particularly suited for effecting control over the fineness of the particles that are ground, i.e., pulverized, in a bowl mill (10) of the type that is designed to be employed for purposes of pulverizing coal. The subject control system (40) is operatively connected in circuit relation with the conveying means (64) by means of which the particles are conveyed from the bowl mill (10) after being ground therewithin. In addition, the subject control system (40) is also operatively connected with the controls (58, 60) of the bowl mill (10). Accordingly, the subject control system (40) is operative to make measurements of the particles being discharged from the bowl mill (10) and based on the information obtained from such measurements effect the changes in the control settings of the bowl mill (10), as required.

11 Claims, 6 Drawing Figures

PULVERIZED SOLID CONTROL SYSTEM

CROSS-REFERENCE TO RELATED APPLICATIONS

This Application is hereby cross-referenced to the following two patent applications which were commonly filed herewith and which are commonly assigned: U.S. patent application, Ser. No. 828,480, filed Feb. 12, 1986. entitled "An In Situ Particle Size Measuring Device", filed in the names of James M. Niziolek and James P. Sutton; and U.S. patent application, Ser. No. 828,479, filed Feb. 12, 1986, entitled "Mounting and Traversing Assembly For In Situ Particle Size Measuring Device", filed in the names of Mark P. Eramo and John M. Holmes.

BACKGROUND OF THE INVENTION

This invention relates to control systems, and more specifically to a control system that is particularly suited to be cooperatively associated with a bowl mill for purposes of continuously measuring the fineness and mass (or volume) flow rates of a multiphase, multicomponent fluid, such as coal particles pneumatically transported in air, and based on such measurements is operative to modulate bowl mill classifier settings or other bowl mill control settings in order to achieve an optimization of the process system of which the bowl mill forms a part.

One of the important parameters in many industrial processes is particle size. As such, it has long been known in the prior art to provide devices that are capable of being employed for purposes of effecting measurements of particles. To this end, the prior art is replete with examples of various types of devices that have been used to obtain measurements of particles. In this regard, in many instances discernible differences exist in the technique by which the measurement of the particles is accomplished. The existence of such differences is, in turn, attributable for the most part to the diverse functional requirements that are associated with the specific application in which such devices are designed to be employed. For instance, in the selection of the particular type of device that is to be utilized for a specific application one of the principal factors to which consideration must be given is that of the nature of the substance of which the particle that is to be measured is formed. Another factor to which consideration must be given is that of the nature of the substance in which the particles are present at the time they are being measured. Yet another factor to which consideration must be given is the relative size of the particles that are to be measured.

Some of the techniques that have been utilized heretodate by the prior art for purposes of accomplishing the measurement of particles include acoustical techniques, optical counting techniques, electrical counting techniques, sedimentation techniques, separation techniques and surface measurement techniques. Moreover, the kinds of particles with which such techniques have been sought to be applied for purposes of making measurements of the particles include such particles as blood particles, food particles, chemical particles, mineral particles as well as others. In addition, diverse ones of the techniques to which reference has been had hereinbefore have been sought to be employed for purposes of accomplishing the measurement of particles while the latter are present in a variety of different types of fluid substances such as various types of gases and various types of liquids.

Unfortunately, however, the devices that have been available in the prior art heretofore for purposes of enabling the techniques to be carried out which have been referred to above have been found to be disadvantageously characterized in one or more respects. To this end, where such devices have been sought to be employed in connection with applications involving industrial processes for purposes of generating information relating to particle size that could be utilized to accomplish, as needed, adjustments to the industrial process, it has not been possible through the use of prior art forms of devices to generate the information required in a sufficiently timely fashion and/or with the desired degree of accuracy. Namely, it has proven to take far too long and/or to require far too much effort to generate the desired information pertaining to particle size for this information to be of any significant value insofar as concerns to the utilization thereof for purposes of making timely adjustments to the industrial process. In large measure this is based on the fact that with the prior art devices that have heretofore been available for use for purposes of effectuating particle size measurements it has not been possible to make measurements in situ therewith. As a result, in order to make use of the prior art devices that have been available heretofore there has most often existed a need to collect a sample from the medium in which are present the particles that it is desired to measure, a need to transport this sample to the device that is to be used to accomplish the particle size measurements, a need go actually perform the particle size measurements with the device, and then finally based on the results of the particle size measurements effectuate whatever adjustments must be made to the industrial process in order to ensure that the particles do in fact embody the size that they must have if the particular industrial process from which the particles that were measured were taken is to be successfully operated.

One form of industrial process in which particle size is known to be an important consideration for the successful operation of the process is the combustion of pulverized coal. As regards the combustion of pulverized coal, it has long been known that an essential component of any steam generation system that utilizes pulverized coal as a fuel is the apparatus in which the coal is pulverized in order to render the coal suitable for such usage. Although the prior art is known to have employed various types of apparatus for purposes of accomplishing coal pulverization, one form of apparatus in particular, which has frequently been used for this purpose, is that commonly referred to as a bowl mill by those in the industry. The bowl mill obtains its name principally from the fact that the pulverization, i.e., grinding, of the coal that takes place therewithin occurs on a grinding surface which in configuration bears a resemblance somewhat to that of a bowl.

By way of illustration, reference may be had to U.S. Pat. No. 3,465,971, which is assigned to the same assignee as the present invention, for a showing of a prior art form of bowl mill. This patent contains a teaching of both the nature of the construction and the mode of operation of a bowl mill that is suitable for use for purposes of effecting the pulverization of the coal that is used to fuel a coal-fired steam generator. As taught by this patent, the essential components of such a bowl mill are a body portion, i.e., housing, within which a grinding table is mounted for rotation, a plurality of grinding rolls that are supported in equally spaced relation one to another in a manner so as to coact with the grinding table such that the coal disposed on the surface of the grinding table is capable of being ground, i.e., pulverized, by the rolls, coal supply means for feeding to the surface of the grinding table the coal that is to be pulverized in the bowl mill, air supply means for providing to the interior of the body portion the air that is required for the operation of the bowl mill, and a classifier that is operative to effect a sorting of the coal particles that are entrained in the air stream which flows to and through the classifier.

In order to satisfy the demands of a coal-fired steam generation system of conventional construction for pulverized coal a multiplicity of bowl mills of the type shown in the aforereferenced patent are commonly required to be employed. Further in this regard it is noted that the individual capacity of each of these bowl mills may range up to a capacity of one hundred tons of pulverized coal per hour. In addition to possessing a capability of operating at their maximum capacity, these bowl mills must also have the ability to operate at less than full capacity, i.e., at some percentage thereof, e.g., 25%, 50%, 75%, etc. Accordingly, this fosters a further requirement that the bowl mill be capable of grinding coal particles to the desired fineness regardless of the rate of output at which the bowl mill is operating. Here note is taken of the fact that variations in the output provided from the bowl mill are normally accomplished by varying the amount of coal that is fed to the grinding table, while the speed of rotation of the grinding table is made to remain substantially constant.

The efficient combustion of pulverized coal, particularly as it relates to the use of pulverized coal as a fuel in a steam generation system, requires that the coal particle size be held close to a specified particle size distribution. Typically, for a medium reactivity coal this is 70% passing through 200 mesh, and 1% not passing through 50 mesh. Based on an economic evaluation for a typical 500 MW coal-fired steam generator power plant, it has been determined that through an increase in carbon conversion rate which in turn is achievable by maintaining a specified particle size distribution, it is possible to realize significant savings amounting to hundreds of thousands of dollars on an annualized basis in the cost of operating a power plant of the size to which reference has been had hereinbefore. Obviously, however, the savings that will be actually realized insofar as any specific power plant that is fueled with pulverized coal is concerned by virtue of maintaining the coal particle size close to a specified particle size distribution will be dependent on a number of factors including the reaction kinetics of the coal, i.e., how sensitive the combustion efficiency is to particle size for the specific coal being used, the grindability of the coal, the abrasiveness of the coal, how well and often control is exercised over the bowl mill to maintain the optimum size distribution of the coal particles, and how well the bowl mill is maintained. In every instance, however, maintaining the size distribution of the coal particles close to the optimum should result in some measure of fuel savings.

Other benefits should also flow from the fact that better control is being exercised over the size distribution of the coal particles. In this regard, reference is had to the fact that there should be reduced slagging in the steam generator due to better control over the size distribution of the coal particles. In addition, if deviations are occurring in the size distribution of the coal particles from that which should be present, necessary adjustments can then be made to the classifier settings of the bowl mill so that the proper size distribution of the coal particles will occur. Also, continuous control may be exercised over the operation of the bowl mill through the use of the information garnered from having made coal particle size measurements. Yet another possibility is to utilize the information acquired from the performance of coal particle size distribution measurements for purposes of obtaining an indication of the fuel-to-air ratio in the coal feed pipe by means of which, in a manner well-known to all, the pulverized coal particles are conveyed from the bowl mill to the steam generator wherein the combustion of the pulverized coal particles takes place.

Thus, there has been evidenced in the prior art a need for a new and improved form of control system suitable for use with various types of grinding, crushing, or other kinds of comminuting devices that function to produce a dispersed multiphase, multicomponent fluid such as, by way of exemplification and not limitation, coal, lime, talc and paint pigments. Further, a need has been evidenced for such a new and improved control system which when employed in conjunction with the aforereferenced types of devices enables continuous control to be effected over the size and distribution of the materials that are being ground, crushed, or otherwise comminuted in the devices. Moreover, a need has been evidenced for such a new and improved control system which makes use of a measurement technique that is nonintrusive such that wear is thereby minimized. In addition, such a new and improved control system also should desirably be characterized by the fact that the control logic thereof allows for an optimization of the product that is being ground, crushed or otherwise comminuted based on a consideration of such factors as the energy cost and maintenance cost associated with the device's operation as well as based on a consideration of how sensitive the downstream process in which the product is intended to be utilized is to the product's characteristics. To this end, such a new and improved control system desirably would not necessarily be operated on a continuous basis for long periods of time, but rather through the use of the appropriate forms of jigs and fixturing would possess the capability of being employed periodically with different devices at the same facility, or with different devices at different facilities.

It is, therefore, an object of the present invention to provide a new and improved control system suitable for use with various types of grinding, crushing or other forms of comminuting devices.

It is another object of the present invention to provide such a control system which is suitable for use with devices of the type that function to produce a dispersed multiphase, multicomponent fluid such as, by way of exemplification and not limitation, coal, lime, talc and paint pigments.

It is still another object of the present invention to provide such a control system which when employed in conjunction with grinding, crushing or other comminuting devices enables continuous control to be effected over the size and distribution of the materials that are being ground, crushed or otherwise comminuted in the devices.

A further object of the present invention is to provide such a control system which makes use of a measurement technique that is nonintrusive such that wear is thereby minimized.

A still further object of the present invention is to provide such a control system that is further characterized by the fact that the control logic thereof allows for an optimization of the product that is being ground, crushed or otherwise comminuted based on a consideration of such factors as the energy cost and maintenance cost associated with the device's operation as well as based on a consideration of how sensitive the downstream process in which the product is intended to be utilized is to the product's characteristics.

A yet still further object of the present invention is to provide such a control system that is operative to detect in a timely fashion equipment failures such as in the case of a bowl mill body liner failures, classifier vane failures, etc.

Yet another object of the present invention is to provide such a control system that is additionally characterized by the fact that the control system does not need to be operated on a continuous basis for long periods of time, but rather through the use of the appropriate forms of jigs and fixturing would possess the capability of being employed periodically with different devices at the same facility, or with different devices at different facilities.

Yet still another object of the present invention is to provide such a control system that is relatively simple to employ as well as being relatively inexpensive to provide.

SUMMARY OF THE INVENTION

In accordance with the present invention there is provided a control system that is designed to be employed for purposes of exercising control over the fineness of the particles that are ground in a mill such as a mill of the type that is suitable for use to pulverize coal. More specifically, there is provided a control system which continuously measures the fineness and mass (or volume) flow rates of a multiphase, multicomponent fluid, such as coal particles pneumatically transported in air, and modulates classifier or mill control settings based on a process optimization strategy. Measurement of the particle fineness and fluid component volume functions is accomplished by measuring the transmission efficiency and diffraction of a light beam directed through a portion of the flow stream. The control system upon which the operation of the subject control system is predicated is one wherein the subject control system operates to modulate feeder speed, gas dampers, and classifier and mill control parameters as required in order to achieve an optimization of product fineness, mass flow rates based on a process cost (or product value) basis, and fuel to air ratio. To this end, the subject control system includes an operation optimization logic module and a control logic module. The operation optimization logic module is connected in circuit relation with the conveying means by which the particles are conveyed from the mill after being ground in the latter whereby signals corresponding to solid fineness and volume fraction are provided in the form of inputs to the operation optimization logic module. The operation optimization logic module is also provided with a further input in the form of a signal corresponding to solids feeder speed. An output is generated by the operation optimization logic module which in turn is provided in the form of an input to the control logic module. Other inputs are supplied to the control logic module in the form of feedback positioning signals corresponding to classifier setting and mill control setting. The outputs which are generated by the control logic module are fed in the form of signals to both the classifier control setting means and the mill control which is utilized for purposes of effecting control over coal fineness.

DESCRIPTION OF A PREFERRED EMBODIMENT

Figure 1:
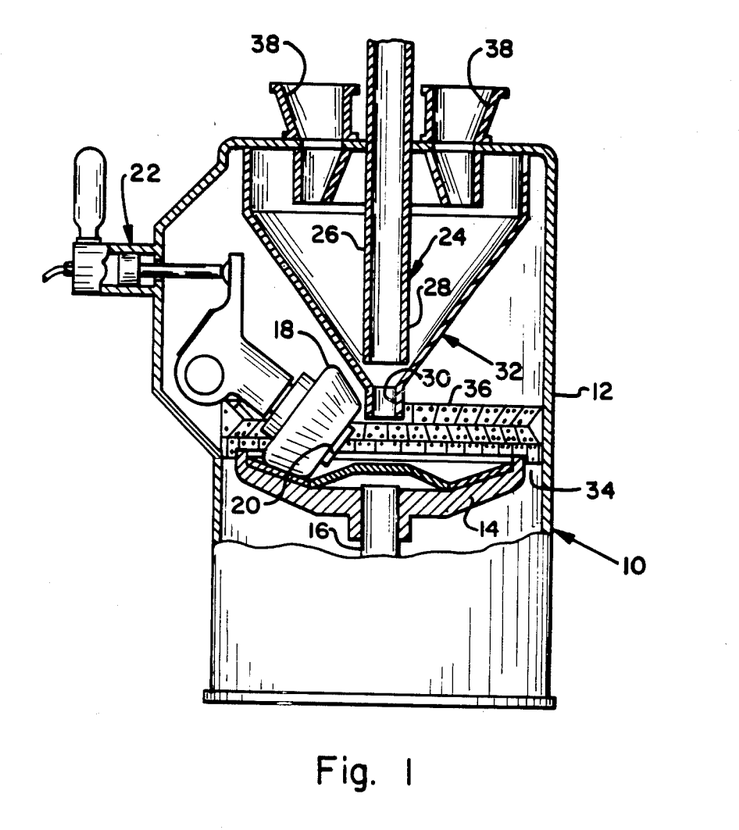
FIG. 1 is a side elevational view partly in section and with some parts broken away of a mill equipped with a pulverized solid control system constructed in accordance with the present invention.

Referring now to the drawing, and more particularly to FIG. 1 thereof, there is depicted therein a bowl mill, generally designated by reference numeral 10. Inasmuch as the nature of the construction and the mode of operation of bowl mills per se are well-known to those skilled in the art, it is not deemed necessary, therefore, to set forth herein a detailed description of the bowl mill 10 illustrated in FIG. 1. Rather, it is deemed sufficient for purposes of obtaining an understanding of a bowl mill 10 which is capable of having cooperatively associated therewith a control system that in accordance with the present invention embodies a construction whereby the control system is operative for purposes of continuously measuring the fineness and mass (or volume) flow rates of a multiphase, multicomponent fluid, such as coal particles pneumatically transported in air, and based on such measurements is operative to modulate bowl mill classifier settings or bowl mill control settings in order to achieve an optimization of the process system of which the bowl mill 10 forms a part that there be presented herein merely a description of the nature of the construction and the mode of operation of the components of the bowl mill 10 with which the aforesaid control system cooperates. For a more detailed description of the nature of the construction and the mode of operation of the components of the bowl mill 10, which are not described in detail herein, one may have reference to the prior art, e.g., U.S. Pat. No. 3,465,971, which issued Sept. 9, 1966 to J. F. Dalenberg et al, and/or U.S. Pat. No. 4,002,299, which issued Jan. 11, 1977 to C. J. Skalka.

Referring further to FIG. 1 of the drawing, the bowl mill 10 as illustrated therein includes a substantially closed separator body 12. A grinding table 14 is mounted on a shaft 16, which in turn is operatively connected to a suitable drive mechanism (not shown) so as to be capable of being rotatably driven thereby. With the aforereferenced components arranged within the separator body 12 in the manner depicted in FIG. 1 of the drawing, the grinding table 14 is designed to be driven in a clockwise direction.

Continuing with a description of the bowl mill 10, a plurality of grinding, i.e., pulverizer, rolls 18, preferably three in number in accord with conventional practice, are suitably supported within the interior of the separator body 12 so as to be spaced equidistantly one from another around the circumference of the latter. Note is made here of the fact that in the interest of maintaining clarity of illustration in the drawing only one grinding roll has been depicted in FIG. 1.

With further regard to the grinding rolls of the bowl mill 10, each of the latter as best understood with reference to the grinding roll 18 depicted in FIG. 1 of the drawing is preferably supported on a suitable shaft, seen at 20 in FIG. 1, for rotation relative thereto. In addition, each of the grinding rolls, as best understood with reference to the grinding roll 18 of FIG. 1 is also suitably supported for movement relative to the upper surface, as viewed with reference to FIG. 1, of the grinding table 14. To this end, each of the grinding rolls of the bowl mill 10 including the roll 18 illustrated in FIG. 1 has a hydraulic means, generally designated in FIG. 1 by the reference numeral 22, cooperatively associated therewith. The hydraulic means 22, in a manner well-known to those skilled in the art of bowl mills, is operative to establish a hydraulic loading on the grinding roll 18 associated therewith whereby the latter grinding roll 18 is made to exert the requisite degree of force on the coal that is disposed on the grinding table 14 for purposes of accomplishing the desired pulverization of this coal.

The material, e.g., coal, that is to be pulverized in the bowl mill 10 is fed thereto by means of any suitable conventional form of feed means. By way of exemplification in this regard, one such feed means that may be employed for this purpose is a belt feeder means (not shown). Upon being discharged from the feed means (not shown), the coal enters the bowl mill 10 by means of a coal supply means, generally designated by reference numeral 24, with which the separator body 12 is suitably provided. In accordance with the embodiment of the bowl mill 10 illustrated in FIG. 1, the coal supply means 24 includes a suitably dimensioned duct 26 having one end thereof which extends outwardly of the separator body 12 is suitably shaped (not shown) so as to facilitate the collection of the coal particles leaving the feeder means (not shown), and the guiding thereafter of these coal particles into the duct 26. The other end 28 of the duct 26 of the coal supply means 24 is operative to effect the discharge of the coal on to the surface of the grinding table 14. To this end, as shown in FIG. 1 of the drawing, the duct end 28 preferably is suitably supported within the separator body 12 through the use of any suitable form of conventional support means (not shown) such that the duct end 28 is coaxially aligned with the shaft 16 that supports the grinding table 14 for rotation, and is located in spaced relation to a suitable outlet 30 provided in the classifier, generally designated by reference numeral 32, through which the coal flows in the course of being fed on to the surface of the grinding table 14.

In accord with the mode of operation of the bowl mills that embody the form of construction depicted in FIG. 1, a gas such as air is utilized to effect the conveyance of the coal from the grinding table 14 through the interior of the separator body 12 for discharge from the bowl mill 10. The air that is used in this regard enters the separator body 12 through a suitable opening (not shown) formed therein for this purpose. From the aforesaid opening (not shown) in the separator body 12 the air flows to and through the annulus, the latter being denoted in FIG. 1 by the reference numeral 34, which consists of the ring-like space that exists between the circumference of the grinding table 14 and the inner wall surface of the separator body 12. The air upon passing through the annulus 34 is deflected over the grinding table 14 preferably by means of a vane wheel assembly, constructed in accordance with the teachings of U.S. Pat. No. 4,523,721 which issued on June 18, 1985 to T. V. Maliszewski et al, and which is assigned to the same assignee as the present application. For purposes of maintaining clarity of illustration in the drawing, only the deflector portion, the latter being seen at 36 in FIG. 1, of the vane wheel assembly which forms the subject matter of U.S. Pat. No. 4,523,721 has been depicted in the drawing. Moreover, it is deemed that the depiction of the deflector portion 36 in FIG. 1 of the drawing is sufficient for purposes of enabling one to obtain a complete understanding of the subject matter of the present invention to which the instant application is directed. However, should further information be desired concerning the nature of the construction and/or the mode of operation of the vane wheel assembly that the bowl mill 10 shown in FIG. 1 embodies, reference may be had for this purpose to U.S. Pat. No. 4,523,721.

While the air is flowing along the path described above, the coal which is disposed on the surface of the grinding table 14 is being pulverized by the action of the grinding rolls 18. As the coal becomes pulverized, the particles are thrown outwardly by centrifugal force away from the center of the grinding table 14. Upon reaching the region of the circumference of the grinding table 14, the coal particles are picked up by the air exiting from the annulus 34 and are carried along therewith. The combined flow of air and coal particles is thereafter captured by the deflector portion 36 of the vane wheel assembly constructed in accordance with the teachings of U.S. Pat. No. 4,523,721. The effect of this is to cause the combined flow of this air and coal particles to be deflected over the grinding table 14. This necessitates a change in direction of the path of flow of this combined stream of air and coal particles. In the course of effecting this change of direction, the heaviest coal particles, because they have more inertia, become separated from the air stream, and fall back on the surface of the grinding table 14 whereupon they undergo further pulverization. The lighter coal particles, on the other hand, because they have less inertia continue to be carried along in the air stream.

After leaving the influence of the aforesaid deflector portion 36 of the vane wheel assembly constructed in accordance with the teachings of U.S. Pat. No. 4,523,721, the combined stream consisting of air and those coal particles that remain flow to the classifier 32 to which mention has previously been had hereinbefore. The classifier 32, in accord with conventional practice and in a manner which is well-known to those skilled in this art, operates to effect a further sorting of the coal particles that remain in the air stream. Namely, those particles of pulverized coal, which are of the desired particle size, pass through the classifier 32 and along with the air are discharged therefrom and thereby from the bowl mill 10 through the outlets 38 with which the latter is provided for this purpose. On the other hand, those coal particles which in size are larger than desired are returned to the surface of the grinding table 14 whereupon they undergo further pulverization. Thereafter, these coal particles are subjected to a repeat of the process described above.

With further regard to the matter of the pulverizing, i.e., grinding, action to which the coal disposed on the grinding table 14 is subjected by the grinding rolls 18, the amount of force that must be exerted by the latter in order to effect the desired degree of pulverization of the coal will vary depending on a number of factors. For example, one important consideration in this regard is the nature of the coal itself. That is, the amount of force required to pulverize the coal will be a function of the grindability of the coal to be pulverized, i.e., the grinding characteristics of the latter. Another important factor in determining the amount of force that the grinding rolls 18 must exert to accomplish the desired degree of pulverization of the coal is the depth to which the coal is disposed on the grinding table 14, which in turn is a function of the output rate at which the bowl mill is being operated.

Figure 2:
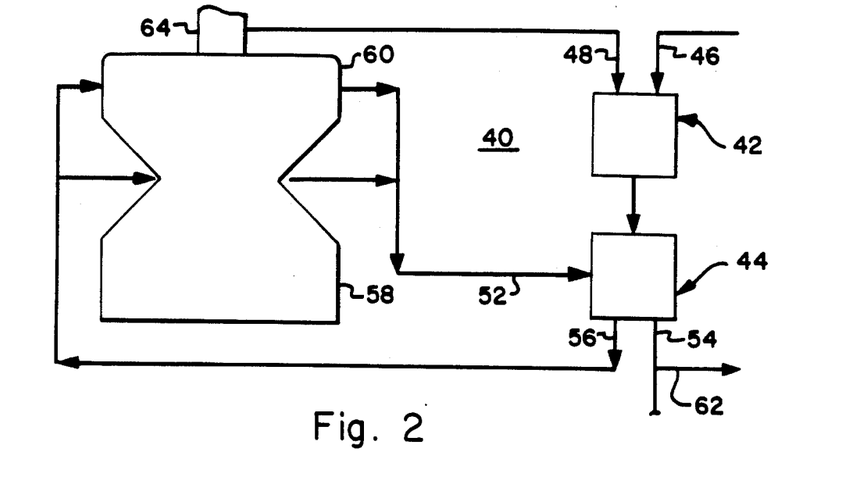
FIG. 2 is a schematic representation of a pulverized solid control system constructed in accordance with the present invention and illustrated cooperatively associated with a mill.
Figure 3:
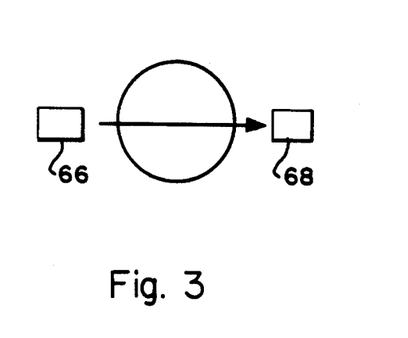
FIG. 3 is a schematic representation of a first arrangement of a particle conveying means and a particle size measuring device cooperatively associated one with another.
Figure 4:
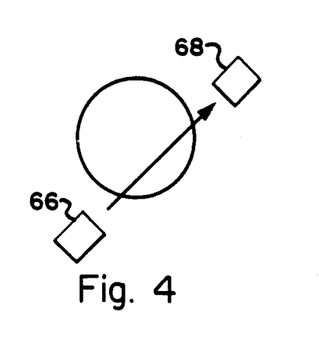
FIG. 4 is a schematic representation of a second arrangement of a particle conveying means and a particle size measuring device cooperatively associated one with another.
Figure 5:
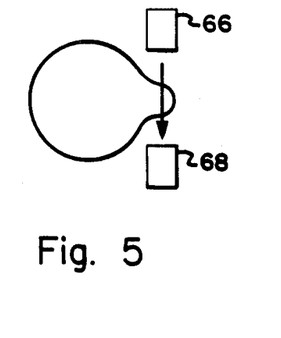
FIG. 5 is a schematic representation of a third arrangement of a particle conveying means and a particle size measuring device cooperatively associated one with another.

Reference will now be had particularly to FIG. 2 of the drawing for purposes of describing the pulverized solid control system, generally designated by reference numeral 40, which in accordance with the present invention is designed to be cooperatively associated with a bowl mill constructed in the manner of the bowl mill 10 of FIG. 1. More specifically, in accord with the present invention, the pulverized solid control system 40 is operative to modulate feeder speeds, gas dampers, classifier and pulverizer control parameters to optimize the product fineness and mass flow rates based on a process cost (or product value) basis. This is accomplished, as will be described more fully hereinafter, by having the pulverized solid control system 40 exercise control i.e., modulate classifier settings and/or bowl mill control settings based on the information garnered from measuring the fineness and mass (or volume) flow rates of the coal particles being pneumatically transported in air after having been ground, i.e., pulverized, in a bowl mill such as the bowl mill embodying a construction as depicted in FIG. 1 of the drawing and having a mode of operation as described hereinbefore.

With further reference to FIG. 2, in accord with the best mode embodiment of the invention the pulverized solid control system 40 includes an operation optimization logic module, the latter being generally designated by the reference numeral 42 in FIG. 2 and a control logic module, which is generally designated by the reference numeral 44 in FIG. 2. When being employed for purposes of effecting an optimization of the product fineness and mass flow rates of the coal particles being pulverized in the bowl mill 10 based on a process cost (or product value) basis, in accord with the best mode embodiment of the pulverized solid control system 40 constructed in accordance with the present invention, the operation optimization logic module 42 is designed to receive a pair of inputs. More specifically, a signal representative of solids feeder speed is provided to the operation optimization logic module 42 in the form of a first input, which in FIG. 2 has been denoted by the reference numeral 46. The other input, denoted by the reference numeral 48 in FIG. 2, which is provided to the operation optimization logic module 42, is in the form of signals corresponding to solids fineness and volume fraction, which as will be described more fully hereinafter are obtained through the use of, for example, "An In Situ Particle Size Measuring Device" constructed in accordance with the teachings of U.S. patent application, Ser. No. 828,480, which was filed concurrently herewith.

The operation optimization logic module 42 in turn is operative to generate an output, the latter being denoted by the reference numeral 50 in FIG. 2, which is then fed in the form of an input to the control logic module 44 from the operation optimization logic module 42. The logic which is utilized for purposes of effecting the derivation of the aforementioned output 50 will now be set forth. To this end, as has been described hereinbefore, the operation optimization logic module 42 receives the following input signals: particle fineness=A, volume fraction=Bv, and solids feeder speed=L. These input signals are then utilized for purposes of solving the following equations: (1) $Ms=Ks(L)$ where Ms=mass flow rate of solids and Ks=solids mass flow proportionality constant; and (2) $Mg=MsBv\rho g/\rho s$ where Mg=mass flow rate of gas, $\Sigma g$=gas density and $\rho s$=solids density. Also, the operation optimization logic module 42 is suitably provided in addition with the following constants and functions: Ce=energy cost, Pp=pulverizer power and is defined by the function $Pp=f(A)f(Mg,Ms)$, Cm=equipment maintenance cost, V=value function and $\Delta T$=time. Utilizing the input constants and functions enumerated above in the formulation (CePp$\Delta T$+Cm−V) the result sought to be achieved is one of minimizing (CePp$\Delta T$+Cm−V) with respect to A and Bm. The last step is the calculation of target values for A and Bv. Upon thus being derived it is these target values which constitute the output 50 which is fed from the operation optimization logic module 42 to the control logic module 44 in the form of an input to the latter.

Turning next to a consideration of the control logic module 44, the latter in addition to receiving the output 50 from the operation optimization logic module 42 also has supplied thereto in the form of input feeback position signals another output, the latter being denoted by the reference numeral 52 in FIG. 2, and to which further reference will be had hereinafter. The control logic module 42 constructed in accordance with the best mode embodiment of the invention of the pulverized solid control system 40 of the present invention is designed to be operative to generate a pair of outputs. One of these outputs, i.e., that denoted by the reference numeral 54 in FIG. 2, is that of a coal flow control signal, while the other, i.e., that denoted by the reference numeral 56 in FIG. 2, is that of control signals which are designed to be supplied to the bowl mill 10 and the classifier 32 thereof for purposes of effectuating control over the operation of the bowl mill 10 and/or the classifier 32 as needed.

The logic which is utilized for purposes of effecting the derivation of the aforereferenced outputs 54 and 56 will now be described. To this end, the input signal received by the control logic module 44 corresponds to the aforedescribed output 50 that is received thereby from the operation optimization logic module 42, which in turn has been derived as described hereinbefore and which encompasses the target values for A and Bv as well as the values for Mg and actual Bv. In addition, the control logic module 44 receives feedback signals indicative of bowl mill control position settings, which for purposes of this discussion is denoted herein by the letter R, and classifier control position settings, which for purposes of this discussion is denoted herein by the letter D. Also, the control logic module 44 is further provided with the following input constants and functions: $\Delta A_1 = f(\Delta R)$, $\Delta A_2 = f(\Delta D)$, and $\Delta Mg = f(\Delta Bv, Mg)$. Utilizing the input constants and functions enumerated above, there is derived the control parameter prioritization for fineness which is expressed in terms of $\Delta R$ and $\Delta D$ control signals, and which is provided from the control logic module 44 as the output 56. Moreover, the input constants and functions enumerated above are also utilized for purposes of effecting a solution to the equation $\Delta Mg = f($targeted value for $Bv -$ actual value of $Bv)$ whereby a $\Delta Mg$ control signal is generated which is provided from the control logic module 44 as the output 54.

Continuing with the description of the nature of the construction and the mode of operation of the pulverized solid control system 40 which is depicted in FIG. 2 of the drawing, the output 56 from the control logic module 44, as appropriate, is designed to be suitably transmitted to the pulverizing, i.e., grinding, section, the latter being denoted by the reference numeral 58 in FIG. 2, of the bowl mill and/or to the classifier section, the latter being denoted by the reference numeral 58 in FIG. 2, of the bowl mill 10. When received at the pulverizing section 58 of the bowl mill 10 the signals leaving the control logic module 44 as the output 56 are designed to be operative to effect the requisite changes in the control settings thereof such as, by way of exemplification and not limitation, changes in ring to roll clearance required in order that the particles leaving the bowl mill 10 will embody the proper fineness for purposes of realizing an optimization of product fineness, mass flow rates based on a process cost (or product value) basis, and fuel to air ratio. In like fashion, when received at the classifier section 60 of the bowl mill 10 the signals leaving the control logic module 44 as the output 56 are operative to effectuate changes in the control settings of the classifier 32 of the bowl mill 10 of FIG. 1, and more specifically in the position settings of the vanes (not shown) of the classifier 32 of the bowl mill 10 of FIG. 1 as such changes are needed in order to ensure that the product being discharged from the bowl mill 10 embodies the proper particle fineness for use for the purpose for which the product is being ground, i.e., pulverized, in the bowl mill 10. Finally, the signals which leave the control logic module 44 as the output 54 are intended to be utilized in a like manner to those of the output 56 for purposes of effecting adjustments relating to coal flow that is needed for purposes of satisfying the requirements of the particular application in which it is sought to make use of the pulverized solid control system 40 constructed in accordance with the present invention. To this end, the output 54 is suitably connected in operative relation, as denoted schematically by the arrow designated in FIG. 2 by the reference numeral 62, to a conventional coal flow device (not shown). In summary, therefore, it is to be understood that the decision logic on which the outputs 54 and 56 from the control logic module 44 are based may be predicated on the $\Delta P$ across the bowl mill or the feedback signals indicative of the actual control parameter settings that are received by the control logic module 44 in the form of input 52.

Referring again to FIG. 2 of the drawing, in accordance with the showing therein the coal particles upon being discharged from the bowl mill 10 are conveyed therefrom in known fashion through conventional coal pipe means, the latter being schematically represented in FIG. 2 wherein the coal pipe means has been designated by the reference numeral 64. More specifically, the coal pipe means 64 in a manner well-known to those skilled in this art is operative to receive the coal particles that are being discharged from the bowl mill 10 through the outlets 38 that have been illustrated in FIG. 1 of the drawing and which have been described hereinbefore, and to thereafter effect the conveyance of these coal particles to some other form of device such as a steam generator (not shown) whereat the coal particles are intended to be utilized as the fuel which fires the steam generator (not shown).

In accordance with the best mode embodiment of the invention the particle size measurements which are made for purposes of generating the signals that are designed to be fed as input 48 to the operation optimization logic module 42 are preferably made as the coal particles are passing through the coal pipe means 64. To this end, one device which is known to be suitable for use for purposes of making the aforereferenced particle size measurements of the coal particles as they pass through the coal pipe means 64 is that which forms the subject matter of U.S. patent application, Ser. No. 828,480, which has been filed concurrently herewith. It is not deemed to be necessary for purposes of acquiring an understanding of the pulverized solid control system 40 to which the present application is directed that there be set forth a detailed description of the in situ particle size measuring device which forms the subject matter of U.S. patent application, Ser. No. 828,480. Rather, it is deemed sufficient for purposes of acquiring an understanding of the pulverized solid control system 40 constructed in accordance with the present invention that recognition be had of the fact that the in situ particle size measuring device to which U.S. patent application, Ser. No. 828,480 is directed makes use of a light source and a detector.

Figure 6:
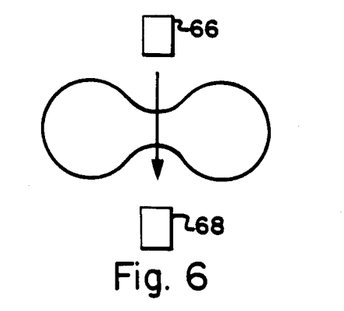
FIG. 6 is a schematic representation of a fourth arrangement of a particle conveying means and a particle size measuring device cooperatively associated one with another.

As will be best understood with reference to FIGS. 3, 4, 5 and 6, the manner in which the light source, the latter being generally designated by the reference numeral 66 in FIGS. 3, 4, 5 and 6, and the detector, the latter being generally designated by the reference numeral 68 in FIGS. 3, 4, 5 and 6, are positioned relative to one another is basically a function of the nature of the fluid in which the particles to be measured are to be found. To this end, as noted hereinbefore a device such as the in situ particle size measuring device which forms the subject matter of U.S. patent application, Ser. No. 828,480 can be utilized to obtain measurements of the particle fineness and fluid component volume fractions of the coal particles that are being pneumatically transported in air through the coal pipe means 64 which measurements in turn are transformed into signals which are received by the operation optimization logic module 42 as input 48. Moreover, these measurements of the particle fineness and fluid component volume fractions are accomplished by measuring the transmission efficiency and diffraction of a light beam generated by the light source 66 as this light beam is directed through a portion of the flow stream containing the particles to be measured and after passing therethrough is received by the detector 68. For fluids with diluted concentrations of the high density (relatively opaque) component and/or large particle (or droplet) sizes preferably the light beam from the light source 66 is directed across the full width of the flow path to the detector 68 in the manner depicted in FIG. 3 of the drawing, or the light beam from the light source 66 is directed across a major fraction of the flow path to the detector 68 in the manner depicted in FIG. 4 of the drawing. On the other hand, for fluids with high concentrations of high density materials and/or small particle sizes, a pinched conduit is preferably employed to sample the fluid in the manner which is to be found depicted in FIG. 5 of the drawing, or a pinched conduit as shown in FIG. 6 of the drawing may be utilized in those instances wherein it is found to be desirable to effect a splitting of flow streams for purposes of effecting measurements of the particles contained therewithin. An alternative to the pinched conduit arrangement is to separate a slip stream, which may be accomplished in any suitable fashion, from the principal flow path.

There will now be set forth a description of the mode of operation of the pulverized solid control system 40, which forms the subject matter of the present invention. For this purpose, reference will be had in particular to FIG. 2 of the drawing. In accord with the mode of operation of the pulverized solid control system 40 of the present invention, signals corresponding to solid fineness and volume fraction generated through the use of a device such as the in situ particle size measuring device which forms the subject matter of U.S. patent application, Ser. No. 828,480, are fed as the input 48 to the operation optimization logic module 42. In addition, the operation optimization logic module 42 receives as the input 46 a signal corresponding to solids feeder speed. Moreover, based on the inputs 46 and 48 that are provided thereto as well as predetermined selected input constants and functions which have been enumerated hereinabove, the operation optimization logic module 42 is operative to generate an output, i.e., the output 50. The output 50 in turn is fed as an input to the control logic module 44. The control logic module 44 also has fed thereto as the input 52 feedback position signals corresponding to the position settings of the control elements of the pulverizing section 58 as well as of the control elements of the classifier section 60 of the bowl mill 10. Like the operation optimization logic module 42, the control logic module 44 is operative to provide outputs, i.e., the outputs 54 and 56, based on the inputs 50 and 52 received thereby as well as predetermined selected input constants and functions which have been enumerated hereinbefore with which the control logic module 48 is suitably provided. The output 54 is in the form of a signal which is designed to be operative to effectuate changes as may be required to accomplish coal flow control. Likewise, the output 56 is in the form of signals which are designed to be operative to accomplish changes as needed in the control elements of the classifier section 60, i.e., the vanes (not shown) of the classifier 32 of the bowl mill 10 of FIG. 1 as well as in the control parameters of the pulverizing section 58. It can thus be seen that the pulverized solid control system 40 embodies a mode of operation wherein the fineness and mass (or volume) flow rates of a multiphase, multicomponent fluid, such as coal particles pneumatically transported in air, are designed to be continuously measured, and in accordance with such measurements classifier and/or bowl mill control settings are modulated as required in order to enable the accomplishment of a process optimization strategy.

By way of summary, although the pulverized solid control system 40 as described hereinabove and as illustrated in the drawings of the instant application has been found to be particularly suited for employment for purposes of exercising control over the operation of a bowl mill such as the bowl mill 10 shown in FIG. 1 and in particular when the bowl mill 10 is designed to be operative to pulverize coal into particles that are intended to be utilized as the fuel for purposes of firing a steam generator (not shown), it is to be understood that the pulverized solid control system 40 of the present invention is also suitable for use in other forms of industrial process applications without departing from the essence of the present invention wherein it is desired to utilize particle size measurements for purposes of exercising control over the operation of the industrial process, i.e. to enable a process optimization strategy to be realized based on the utilization of measurements relating to particle size. However, when being utilized as described and illustrated herein for purposes of exercising control over a bowl mill such as the bowl mill 10 of FIG. 1, there are a number of control parameters over which such control may be exercised. In this regard, by way of exemplification and not limitation, these control parameters include the following: gas flow, gas temperature, classifier vane settings, ring to roll clearance, and journal loading. There are three in particular though among these control parameters which are most frequently the subject of adjustments based on the information which is obtained from the particle size measurements. These are adjustments to (1) classifier vane settings, (2) gas flow, and (3) gas temperature.

Thus, in accordance with the present invention there has been provided a new and improved control system suitable for use with various types of grinding, crushing or other forms of comminuting devices. Moreover, the control system of the present invention is suitable for use with devices of the type that function to produce a dispersed multiphase, multicomponent fluid such as, by way of exemplification and not limitation, coal, lime, talc and paint pigments. In addition, in accord with the present invention a control system is provided which when employed in conjunction with grinding, crushing, or other comminuting devices enables continuous control to be effected over the size and distribution of the materials that are being ground, crushed or otherwise comminuted in the devices. Further, the control system of the present invention is characterized in that it makes use of a measurement technique that is nonintrusive such that wear is thereby minimized. Additionally, in accordance with the present invention, a control system is provided that is further characterized by the fact that the control logic thereof allows for an optimization of the product that is being ground, crushed, or otherwise comminuted based on a consideration of such factors as the energy cost and maintenance cost associated with the device's operation as well as based on a consideration of how sensitive the downstream process in which the product is intended to be utilized is to the product's characteristics. Also, the control system of the present invention is additionally characterized by the fact that the control system does not need to be operated on a continuous basis for long periods of time, but rather through the use of the appropriate forms of jigs and fittings would possess the capability of being employed periodically with different devices at the same facility or with different devices at different facilities. Furthermore, in accordance with the present invention a control system has been provided that is relatively simple to employ as well as being relatively inexpensive to provide.

While only one embodiment of our invention has been shown and described herein, it will be appreciated that modifications thereof, some of which have been alluded to hereinabove, may still be readily made thereto by those skilled in the art. We, therefore, intend by the appended claims to cover the modifications alluded to herein as well as all other modifications which fall within the true spirit and scope of our invention.

What is claimed is:

1. A control system for exercising control over the fineness of the particles ground in a bowl mill comprising:
   (a) first signal means for supplying signals indicating the fineness of the particles being discharged from the bowl mill;
   (b) operation optimization logic means connected in circuit relation with said first signal means for receiving signals from said first signal means as an input to said operation optimization logic means, said operation optimization logic means having a pre-established bank of data stored therein relating to the grinding of particles in the bowl mill, said operation optimization logic means upon receipt of signals from said first signal means being operative to determine the nature of adjustments to be made in the grinding operation occurring in the bowl mill, said operation optimization logic means being operative to provide an output reflective of the nature of adjustments to be made in the grinding operation occurring within the bowl mill;
   (c) control logic means connected in circuit relation with said operation optimization logic means for receiving said output therefrom, said control logic means having a pre-established bank of data stored therein pertaining to the control of the operation of the bowl mill, said control logic means upon receipt of said output from said operation optimization logic means being operative to determine the nature of corrections required to be made in the control of the operation of the bowl mill, said control logic means further being operative to produce a first output reflecting the nature of corrections required to be made in the control of the operation of the bowl mill; and
   (d) first output means connected in circuit relation with said control logic means and with the bowl mill controls, said first output means being operative to transmit said first output from said control logic means to the bowl mill controls.

2. The control system as set forth in claim 1 wherein the signals supplied by said first signal means further indicates the mass or volume flow rate of the particles being discharged from the bowl mill.

3. The control system as set forth in claim 2 further including second signal means for supplying signals indicating the speed of feed to the bowl mill of the solids to be ground into particles in the bowl mill, said second signal means being connected in circuit relation with said operation optimization logic means, said second signal means being operative to provide to said operation optimization logic means signals reflecting the speed of feed to the bowl mill of the solids to be ground into particles in the bowl mill.

4. The control system as set forth in claim 3 wherein said operation optimization logic means includes an operation optimization logic module.

5. The control system as set forth in claim 4 wherein the pre-established bank of data stored in said operation optimization logic means comprises predetermined constants and functions applicable to the grinding of particles in the bowl mill.

6. The control system as set forth in claim 3 wherein said control logic means includes a control logic module.

7. The control system as set forth in claim 6 wherein the pre-established bank of data stored in said control logic means comprises predetermined constants and functions applicable to the control of the operation of the bowl mill.

8. The control system as set forth in claim 7 further including feedback position signal means connected in circuit relation with said control logic means, said feedback position signal means being operative to supply signals to said control logic means indicative of the control position settings of the bowl mill in the form of an input to said control logic means.

9. The control system as set forth in claim 3 wherein said control logic means upon receipt of said output from said operation optimization logic means being further operative to determine the nature of corrections required to be made in the control of the feed of solids to the bowl mill, said control logic means also being operative to produce a second output reflecting the nature of corrections required to be made in the control of the feed of solids to the bowl mill.

10. The control system as set forth in claim 9 further including second output means connected in circuit relation with said control logic means and with the solids feed controls, said second output means being operative to transmit said second output from said control logic means to the solids feed controls.

11. The method of exercising control over the operation of a bowl mill based on measurements made of the particles being discharged from the bowl mill comprising the steps of:
   (a) providing a pre-established bank of data pertaining to the grinding of particles in the bowl mill;
   (b) making measurements of the particles being discharged from the bowl mill;
   (c) supplying signals representative of the measurements made of the particles being discharged from the bowl mill;
   (d) comparing the signals representative of the measurements made of the particles with the pre-established bank of data to determine the need for adjustments to be made in the grinding operation occurring in the bowl mill;
   (e) producing an output when a need is determined to exist for adjustments to be made in the grinding operation occurring in the bowl mill corresponding to the adjustments required;
   (f) providing a pre-established bank of data pertaining to the control of the operation of the bowl mill;
   (g) determining based on the pre-established bank of data pertaining to the control of the operation of the bowl mill the nature of adjustments to the controls of the bowl mill required to accomplish the adjustments in grinding operation of (e); and
   (h) producing an output corresponding to the nature of adjustments to the controls of the bowl mill required to accomplish the adjustments in grinding operation of (e).

* * * * *